(12) United States Patent
Miyashita

(10) Patent No.: US 9,027,539 B2
(45) Date of Patent: May 12, 2015

(54) CONTROL APPARATUS FOR INTERNAL COMBUSTION ENGINE

(75) Inventor: Shigeki Miyashita, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 969 days.

(21) Appl. No.: 13/056,070

(22) PCT Filed: Nov. 19, 2008

(86) PCT No.: PCT/JP2008/071041
§ 371 (c)(1),
(2), (4) Date: Jan. 26, 2011

(87) PCT Pub. No.: WO2010/058461
PCT Pub. Date: May 27, 2010

(65) Prior Publication Data
US 2011/0126812 A1 Jun. 2, 2011

(51) Int. Cl.
*F02B 37/18* (2006.01)
*F02B 29/04* (2006.01)
(Continued)

(52) U.S. Cl.
CPC .......... *F02D 41/1454* (2013.01); *F01N 13/107* (2013.01); *F02B 37/025* (2013.01); *F02B 37/18* (2013.01); *F02D 41/0007* (2013.01); *Y02T 10/144* (2013.01)

(58) Field of Classification Search
CPC . F02D 41/0007; F02M 25/0707; F02B 37/18; F02B 29/04; Y02T 10/144
USPC ........................................... 123/703; 60/277
See application file for complete search history.

(56) References Cited

U.S. PATENT DOCUMENTS 5,569,847 A * 10/1996 Hasegawa et al. .......... 73/114.72
7,040,085 B2 * 5/2006 Namiki ............................ 60/277
(Continued)

FOREIGN PATENT DOCUMENTS

DE 102008018045 A1 10/2008
EP 1 277 943 A1 1/2003
(Continued)

OTHER PUBLICATIONS

Supplementary European Search Report dated Apr. 5, 2012 of EP 2348213 (PCT/JP2008/071041).
(Continued)

*Primary Examiner* — Stephen K Cronin
*Assistant Examiner* — David Hamaoui
(74) *Attorney, Agent, or Firm* — Kenyon & Kenyon LLP

(57) ABSTRACT

The present invention intends to perform control for detecting a change in air-fuel ratio with high accuracy by an exhaust gas sensor in an internal combustion engine having a turbocharger with a wastegate valve. A control apparatus for an internal combustion engine according to the present invention includes: a turbocharger; a wastegate through which an exhaust gas passes while bypassing a turbine; a wastegate valve for opening/closing the wastegate; an exhaust gas sensor provided in an exhaust passage on the downstream side from the turbine and the wastegate valve; and air-fuel ratio change detection controlling means for executing air-fuel ratio change detection control to change an air-fuel ratio on the upstream side from the turbine and the wastegate valve and detect a change in the air-fuel ratio by the exhaust gas sensor. The air-fuel ratio change detection controlling means executes the air-fuel ratio change detection control when the opening degree of the wastegate valve is less than a predetermined value.

7 Claims, 5 Drawing Sheets

(51) Int. Cl.
*F02D 41/14* (2006.01)
*F01N 13/10* (2010.01)
*F02B 37/02* (2006.01)
*F02D 41/00* (2006.01)

(56) References Cited

U.S. PATENT DOCUMENTS

| | | | |
|---|---|---|---|
| 7,086,391 B2 * | 8/2006 | Moulin et al. | 123/673 |
| 7,753,039 B2 * | 7/2010 | Harima et al. | 123/676 |
| 7,900,616 B2 * | 3/2011 | Saunders | 123/688 |
| 7,980,060 B2 * | 7/2011 | Tachimoto et al. | 60/277 |
| 2009/0292446 A1 * | 11/2009 | Tanaka | 701/103 |
| 2011/0005207 A1 * | 1/2011 | Akihisa et al. | 60/286 |

FOREIGN PATENT DOCUMENTS

| | | |
|---|---|---|
| JP | 2006-009674 A | 1/2006 |
| JP | 2006-274963 A | 10/2006 |
| JP | 2006-291768 A | 10/2006 |
| JP | 2007-009877 A | 1/2007 |
| JP | 2007-154836 A | 6/2007 |
| JP | 2008-095542 A | 4/2008 |
| JP | 2008-138562 A | 6/2008 |
| WO | 2008/041109 A1 | 4/2008 |

OTHER PUBLICATIONS

International Preliminary Report on Patentability mailed Jun. 16, 2011 of PCT/JP2008/071041.

* cited by examiner

CONTROL APPARATUS FOR INTERNAL COMBUSTION ENGINE

This is a 371 national phase application of PCT/JP2008/071041 filed 19 Nov. 2008, the content of which is incorporated herein by reference.

TECHNICAL FIELD

The present invention relates to a control apparatus for an internal combustion engine.

BACKGROUND ART

JP-A-2006-274963 discloses an invention for changing the amplitude of air-fuel ratio fluctuation in perturbation control corresponding to fluctuation in exhaust gas volume in an apparatus for performing perturbation control where an exhaust air-fuel ratio is alternately changed to a rich side and a lean side with respect to a stoichiometric air-fuel ratio to quickly warm up a three-way catalyst at the time of cold starting of an engine.
Patent Document 1: JP-A-2006-274963
Patent Document 2: JP-A-2006-9674

DISCLOSURE OF THE INVENTION

Problems to be Solved by the Invention

Control for changing an air-fuel ratio may be also performed other than to warm up a catalyst. For example, when the oxygen storage capacity of the catalyst is measured, control for alternately changing the air-fuel ratio to a rich side and a lean side with respect to a stoichiometric air-fuel ratio is performed. In this case, a control target air-fuel ratio of an engine is switched based on the output of a post-catalyst sensor provided on the downstream side of the catalyst. That is, the control target air-fuel ratio is changed to a lean air-fuel ratio when the output of the post-catalyst sensor is changed from lean to rich, and to a rich air-fuel ratio when the output of the post-catalyst sensor is changed from rich to lean.

When the output of the post-catalyst sensor is changed from rich to lean, oxygen is fully stored in the catalyst. When the control target air-fuel ratio is changed from the lean air-fuel ratio to the rich air-fuel ratio in this state, the air-fuel ratio of an exhaust gas flowing into the catalyst is also changed from lean to rich. The air-fuel ratio of the exhaust gas flowing into the catalyst is detected by a pre-catalyst sensor provided on the upstream side of the catalyst. The oxygen storage capacity can be calculated based on the amount of excess fuel flowing into the catalyst from when the pre-catalyst sensor detects that the air-fuel ratio of the exhaust gas flowing into the catalyst is changed from lean to rich to when the output of the post-catalyst sensor is changed from lean to rich.

To accurately measure the oxygen storage capacity of the catalyst using the aforementioned method, it is important to detect a timing at which the air-fuel ratio of the exhaust gas flowing into the catalyst is changed between lean and rich with high accuracy by the pre-catalyst sensor.

According to the knowledge of the present inventor, however, there is a problem that accurate measurement values are difficult to obtain when the oxygen storage capacity of the catalyst is measured using the aforementioned method in an engine having a turbocharger with a wastegate valve. The reason is as follows.

When an exhaust gas discharged from the engine flows into a turbine of the turbocharger, it takes a longer time to reach the pre-catalyst sensor since the exhaust gas passes through the turbine. Meanwhile, when the exhaust gas passes through a wastegate, the exhaust gas reaches the pre-catalyst sensor faster since the exhaust gas does not pass through the turbine. Thus, for example, in a case in which the air-fuel ratio of the engine is switched from lean to rich, the air-fuel ratio of the exhaust gas passing through the turbine to reach the pre-catalyst sensor remains lean when the air-fuel ratio of the exhaust gas passing through the wastegate to reach the pre-catalyst sensor is changed to rich. Accordingly, even when the air-fuel ratio of the engine is abruptly changed, a mixed gas of two exhaust gases having different air-fuel ratios flows for a certain period at the position of the pre-catalyst sensor. Thus, the air-fuel ratio is detected to change slowly by the pre-catalyst sensor. As a result, it is difficult to detect the timing at which the air-fuel ratio of the exhaust gas flowing into the catalyst is changed from lean to rich with high accuracy, so that accurate measurement values are difficult to obtain when the oxygen storage capacity or the like is measured.

The present invention has been made to solve the aforementioned problems, and it is an object of this invention to provide a control apparatus for an internal combustion engine capable of performing control for detecting a change in air-fuel ratio by an exhaust gas sensor with high accuracy in an internal combustion engine having a turbocharger with a wastegate valve.

Solution to Problem

A first invention for achieving the above object is a control apparatus for an internal combustion engine, comprising:
a turbocharger having a turbine operating with exhaust energy of an internal combustion engine, and a compressor for compressing an intake gas;
a wastegate through which an exhaust gas passes while bypassing the turbine;
a wastegate valve for opening/closing the wastegate;
an exhaust gas sensor provided in an exhaust passage on a downstream side from the turbine and the wastegate valve; and
air-fuel ratio change detection controlling means for executing air-fuel ratio change detection control to change an air-fuel ratio on an upstream side from the turbine and the wastegate valve and detect a change in the air-fuel ratio by the exhaust gas sensor,
wherein the air-fuel ratio change detection controlling means executes the air-fuel ratio change detection control when an opening degree of the wastegate valve is less than a predetermined value.

A second invention is in accordance with the first invention, wherein:
the air-fuel ratio change detection controlling means executes the air-fuel ratio change detection control when the wastegate valve is fully closed.

A third invention is in accordance with the first or second invention, wherein:
the air-fuel ratio change detection controlling means comprises means for controlling the wastegate valve such that the opening degree of the wastegate valve is less than the predetermined value before executing the air-fuel ratio change detection control.

A fourth invention is in accordance with the first or second invention, further comprising:
opening-closing state determining means for determining an opening-closing state of the wastegate valve; and
prohibiting means for prohibiting the execution of the air-fuel ratio change detection control when the opening-closing state determining means determines that the opening degree of the wastegate valve is equal to or more than the predetermined value.

A fifth invention is in accordance with any one of the first to fourth inventions, wherein:

the air-fuel ratio change detection control is control for diagnosing the exhaust gas sensor or an exhaust purification catalyst.

A sixth invention is in accordance with any one of the first to fifth inventions, wherein:

the internal combustion engine comprises a plurality of cylinders, and the air-fuel ratio change detection controlling means first changes an air-fuel ratio of a cylinder where an exhaust passage on the upstream side from the turbine has a largest volume when changing an air-fuel ratio of each of the cylinders.

Advantages of the Invention

According to the first invention, the air-fuel ratio change detection control for changing the air-fuel ratio on the upstream side from the turbine and the wastegate valve to detect the change in the air-fuel ratio by the exhaust gas sensor can be executed when the opening degree of the wastegate valve is less than the predetermined value. The air-fuel ratio change detection control can be thereby reliably prevented from being adversely affected by a difference between a time required for a turbine passing gas to reach the exhaust gas sensor and a time required for a wastegate passing gas to reach the exhaust gas sensor. Accordingly, the air-fuel ratio change detection control can be executed with high accuracy.

According to the second invention, the air-fuel ratio change detection control can be executed when the wastegate valve is fully closed. The air-fuel ratio change detection control can be thereby executed with the amount of wastegate passing gas being zero. Accordingly, the air-fuel ratio change detection control can be more reliably prevented from being adversely affected by the difference between the time required for the turbine passing gas to reach the exhaust gas sensor and the time required for the wastegate passing gas to reach the exhaust gas sensor.

According to the third invention, the wastegate valve can be controlled such that the opening degree of the wastegate valve is less than the predetermined value before executing the air-fuel ratio change detection control. Accordingly, the aforementioned advantages can be achieved in a system where the opening/closing of the wastegate valve is actively controlled by an ECU.

According to the fourth invention, the execution of the air-fuel ratio change detection control can be prohibited when the opening degree of the wastegate valve is determined to be equal to or more than the predetermined value. Accordingly, the aforementioned advantages can be achieved in a system where the opening/closing of the wastegate valve is passively controlled according to an operating condition of an internal combustion engine.

According to the fifth invention, the control for diagnosing the exhaust gas sensor or the exhaust purification catalyst can be executed with higher accuracy.

According to the sixth invention, the air-fuel ratio of the cylinder where the exhaust passage on the upstream side from the turbine has a largest volume can be changed first when the air-fuel ratio of each of the cylinders is changed in the air-fuel ratio change detection control. Accordingly, an air-fuel ratio change period at the position of the exhaust gas sensor can be shortened, so that a timing at which the air-fuel ratio is changed can be detected with higher accuracy.

DESCRIPTION OF REFERENCE NUMERALS

Figure 1:
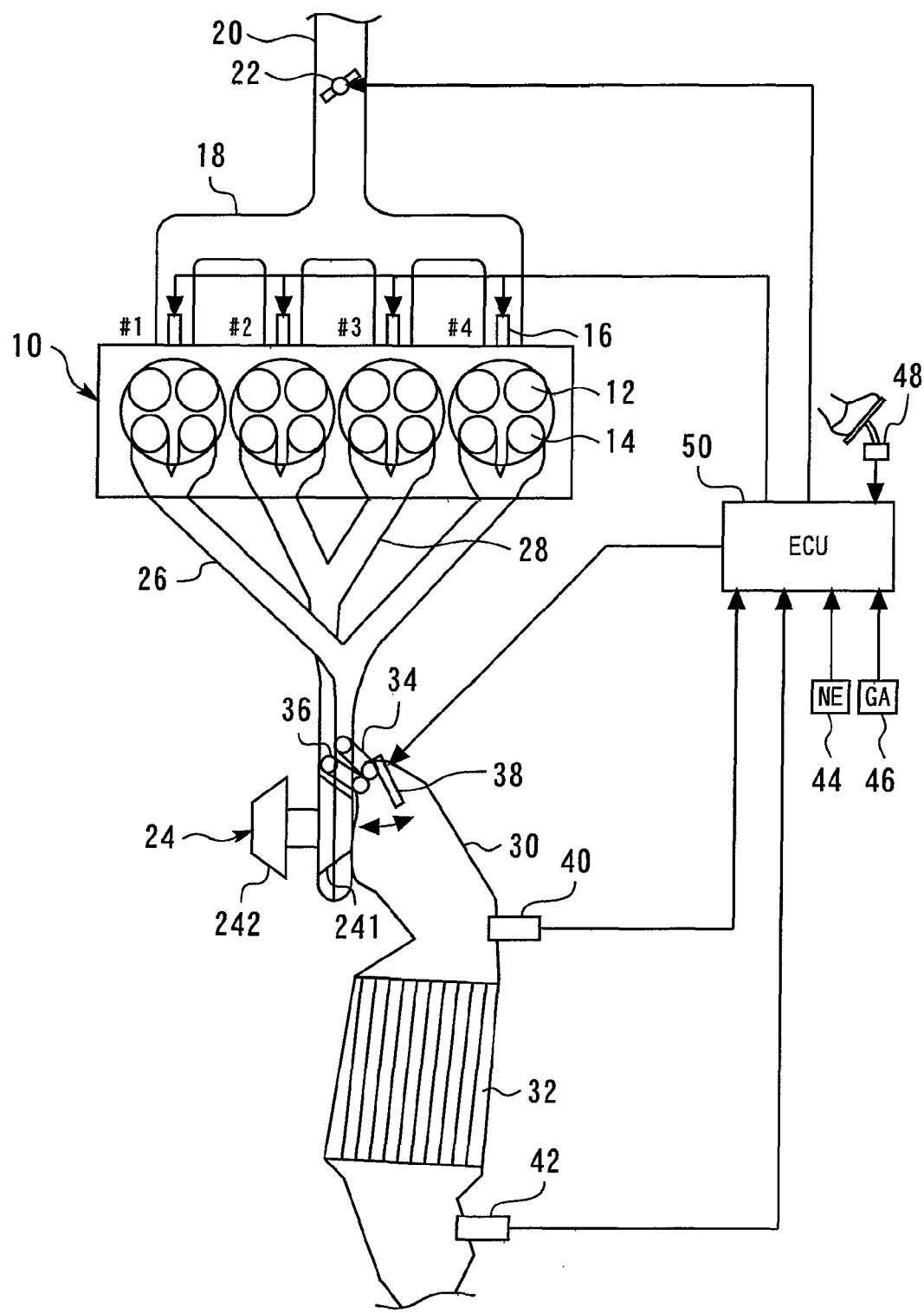
FIG. 1 is a view for explaining the configuration of a system according to a first embodiment of the present invention.

10 internal combustion engine
12 intake valve
14 exhaust valve
16 fuel injector
18 intake manifold
20 intake passage
22 throttle valve
24 turbocharger
241 turbine
242 compressor
26 first exhaust manifold
28 second exhaust manifold
30 exhaust passage
32 catalyst
34, 36 wastegate
38 wastegate valve
40 pre-catalyst sensor
42 post-catalyst sensor
44 engine rotation speed sensor
46 airflow meter
48 accelerator position sensor
50 ECU

BEST MODE FOR CARRYING OUT THE INVENTION

Embodiment 1

FIG. 1 is a view for explaining the configuration of a system according to a first embodiment of the present invention. As shown in FIG. 1, the system according to the present embodiment includes an internal combustion engine 10 mounted on a vehicle as a power source. The internal combustion engine 10 according to the present embodiment is an in-line four-cylinder type having four cylinders #1 to #4. The explosion order is #1→∩3→#4→2. Note that the number and arrangement of cylinders is not limited to that described above in the present invention.

An intake valve 12, an exhaust valve 14, and a fuel injector 16 are provided in each of the cylinders of the internal combustion engine 10. The fuel injector 16 is provided so as to inject fuel into an intake port of each of the cylinders. Note that the present invention is not limited to the configuration described above, and the fuel injector may be provided so as to inject fuel directly into each of the cylinders.

An intake passage 20 is connected to the internal combustion engine 10 via an intake manifold 18. A throttle valve 22 is provided in the intake passage 20 to regulate the amount of intake air.

The internal combustion engine 10 according to the present embodiment includes a turbocharger 24. The turbocharger 24 includes a turbine 241 operating with the exhaust gas energy of the internal combustion engine 10, and a compressor 242 driven by the turbine 241. Although not shown in the drawings, the intake passage 20 is connected to the compressor 242. Intake air can be compressed by the compressor 242.

The turbocharger 24 according to the present embodiment is a twin entry type (a twin scroll type) where the turbine 241 has two inlets. A first exhaust manifold 26 is connected to one of the inlets of the turbine 241, and a second exhaust manifold 28 is connected to the other inlet. The first exhaust manifold 26 is connected to the cylinders #1 and #4. An exhaust gas discharged from the cylinder #1 and an exhaust gas discharged from the cylinder #4 merge in the first exhaust manifold 26 to flow into the one inlet of the turbine 241. The second exhaust manifold 28 is connected to the cylinders #2 and #3. An exhaust gas discharged from the cylinder #2 and an exhaust gas discharged from the cylinder #3 merge in the second exhaust manifold 28 to flow into the other inlet of the turbine 241. By using the twin entry type turbocharger 24, exhaust pulsation interference between the cylinders can be suppressed, so that excellent supercharging characteristics can be obtained.

An exhaust passage 30 is connected to the outlet of the turbine 241. A catalyst 32 for purifying the exhaust gas is provided in the exhaust passage 30. The catalyst 32 is a three-way catalyst having an $O_2$ storage function (an oxygen storage function).

A wastegate 34 allowing a portion of the exhaust gas in the first exhaust manifold 26 to flow to the exhaust passage 30 on the downstream side of the turbine 241 without passing through the turbine 241, a wastegate 36 allowing a portion of the exhaust gas in the second exhaust manifold 28 to flow to the exhaust passage 30 on the downstream side of the turbine 241 without passing through the turbine 241, and a wastegate valve 38 for opening/closing both the wastegates 34 and 36 are provided in the vicinity of the turbocharger 24.

The wastegate valve 38 according to the present embodiment includes a valve member capable of rotating to a closed position to seal the outlets of both the wastegates 34 and 36 and to an open position to release the outlets, and an actuator (not shown) for displacing the valve member. The opening degree of the wastegate valve 38 is controlled by an ECU 50 described below.

In the system according to the present embodiment, the wastegate valve 38 is opened during high-load operation to allow a portion of the exhaust gas to flow to the exhaust passage 30 without passing through the turbine 241. Accordingly, an exhaust pressure (a back pressure) or a supercharging pressure can be reliably prevented from being excessive.

A pre-catalyst sensor 40 for detecting the air-fuel ratio of the exhaust gas flowing into the catalyst 32 (also referred to as "pre-catalyst air-fuel ratio A/Ffr" below) is provided on the downstream side from the turbine 241 and the wastegate valve 38 and on the upstream side from the catalyst 32. The pre-catalyst sensor 40 according to the present embodiment is a so-called wide-range air-fuel ratio sensor, which can continuously detect the air-fuel ratio over a relatively wide range, and outputs a signal proportional to the air-fuel ratio.

A post-catalyst sensor 42 for detecting the air-fuel ratio of the exhaust gas flowing out from the catalyst 32 (also referred to as "post-catalyst air-fuel ratio A/Frr" below) is provided on the downstream side from the catalyst 32. The post-catalyst sensor 42 according to the present embodiment is a so-called $O_2$ sensor, and has such characteristics that its output changes sharply at a stoichiometric air-fuel ratio.

The system according to the present embodiment further includes an engine rotation speed sensor 44 for detecting the rotation speed of the internal combustion engine 10, an airflow meter 46 for detecting the amount of intake air of the internal combustion engine 10, an accelerator position sensor 48 for detecting the position of an accelerator pedal installed at the driver's seat of a vehicle, and the ECU (Electronic Control Unit) 50. The ECU 50 includes a CPU, a ROM, a RAM, an input-output port, and a storage device (none of those are shown in the drawings). The aforementioned various sensors and actuators are electrically connected to the ECU 50. The ECU 50 controls the opening degree of the throttle valve 22, the amount of fuel injection from the fuel injector 16, the opening degree of the wastegate valve 38 or the like based on the detection values of the various sensors or the like.

The catalyst 32 purifies NOx, HC and CO at the same time when an air-fuel ratio A/F of the exhaust gas flowing into the catalyst 32 is a stoichiometric air-fuel ratio A/Fs. Thus, the ECU 50 controls the air-fuel ratio such that the air-fuel ratio of the exhaust gas flowing into the catalyst 32 is the stoichiometric air-fuel ratio A/Fs when the internal combustion engine 10 is in normal operation. To be more specific, the ECU 50 sets a target air-fuel ratio A/Ft equal to the stoichiometric air-fuel ratio A/Fs, and controls the amount of fuel injection from the fuel injector 16 such that the pre-catalyst air-fuel ratio A/Ffr detected by the pre-catalyst sensor 40 agrees with the target air-fuel ratio A/Ft. Accordingly, the air-fuel ratio of the exhaust gas flowing into the catalyst 32 is maintained close to the stoichiometric air-fuel ratio, so that the catalyst 32 exerts maximum purification performance.

The catalyst 32 contains a noble metal (an active site) as typified by Pt and Pd, and an oxygen storage component capable of absorbing and releasing oxygen according to the air-fuel ratio of atmosphere gas. When the atmosphere gas of the catalyst 32 is richer than the stoichiometric air-fuel ratio A/Fs, oxygen stored in the oxygen storage component is released. An unburnt component such as HC and CO can be thereby oxidized and purified by the released oxygen. On the contrary, when the atmosphere gas of the catalyst 32 is leaner than the stoichiometric air-fuel ratio A/Fs, the oxygen storage component absorbs oxygen from the atmosphere gas. NOx can be thereby reduced and purified.

Because of the oxygen absorption and release action as described above, three exhaust gas components of NOx, HC and CO can be purified at the same time even when the air-fuel ratio of the exhaust gas flowing into the catalyst 32 fluctuates to a certain degree with respect to the stoichiometric air-fuel ratio A/Fs.

The oxygen storage performance of the catalyst 32 is reduced as the internal combustion engine 10 is used over the years. The reduction degree of the oxygen storage performance of the catalyst 32 is correlated with the deterioration degree of the catalyst 32. Thus, in the present embodiment, the oxygen storage performance of the catalyst 32 is measured to diagnose the deterioration degree of the catalyst 32.

Here, the oxygen storage performance of the catalyst 32 is represented by the magnitude of oxygen storage capacity (OSC) as the maximum oxygen amount that can be stored in the current catalyst 32.

In the following, control executed to detect the deterioration of the catalyst 32 (to measure the oxygen storage capacity) in the present embodiment will be described. In the present embodiment, active air-fuel ratio control is executed to detect the deterioration of the catalyst 32. The active air-fuel ratio control is control where the pre-catalyst air-fuel ratio A/Ffr is alternately forcibly changed to a rich side and a lean side with respect to a predetermined center air-fuel ratio A/Fc. An air-fuel ratio changed to the rich side is referred to as a rich air-fuel ratio A/Fr, and an air-fuel ratio changed to the lean side is referred to as a lean air-fuel ratio A/Fl.

The deterioration detection of the catalyst 32 is normally executed at least once per trip of the internal combustion engine 10. When the deterioration of the catalyst 32 continues to be detected through a plurality of trips, the catalyst 32 is finally diagnosed to be abnormal, and a warning device such as a check lamp is activated. The trip indicates a period from the start to stop of the internal combustion engine 10.

In FIGS. 2(A) and 2(B), the outputs of the pre-catalyst sensor 40 and the post-catalyst sensor 42 in the active air-fuel ratio control are respectively indiCated by solid lines. In FIG. 2(A), the target air-fuel ratio A/Ft set by the ECU 50 is also indicated by a dashed line.

As shown in FIG. 2(A), the target air-fuel ratio A/Ft is alternately forcibly switched to an air-fuel ratio (the rich air-fuel ratio A/Fr) apart from the stoichiometric air-fuel ratio A/Fs as the center air-fuel ratio to the rich side by a predetermined amplitude (a rich amplitude Ar, A>0), and to an air-fuel ratio (the lean air-fuel ratio A/Fl) apart from the stoichiometric air-fuel ratio A/Fs to the lean side by a predetermined amplitude (a lean amplitude Al, Al>0). The pre-catalyst air-fuel ratio A/Ffr as an actual value is also switched with a time delay following the switching of the target air-fuel ratio A/Ft. A stroke delay as a time required for the operation gas of the internal combustion engine 10 to be discharged through an intake stroke, a compression stroke, an expansion stroke, and an exhaust stroke, a transport delay as a time required for the exhaust gas discharged from the internal combustion engine 10 to reach the pre-catalyst sensor 40, or the like constitute the time delay.

In the example shown in the drawings, the rich amplitude Ar and the lean amplitude Al are equal to each other. To be more specific, the rich air-fuel ratio A/Fr=14.1, the lean air-fuel ratio A/Fl=15.1, and the rich amplitude Ar=the lean amplitude Al=0.5 when the stoichiometric air-fuel ratio A/Fs=14.6, for example.

The target air-fuel ratio A/Ft is switched at a timing at which the output of the post-catalyst sensor 42 is switched from rich to lean, or from lean to rich. As described above, the output voltage of the post-catalyst sensor 42 changes sharply at the stoichiometric air-fuel ratio A/Fs. That is, the output voltage of the post-catalyst sensor 42 is equal to or more than a rich determination value VR when the post-catalyst air-fuel ratio A/Frr is an air-fuel ratio on the rich side smaller than the stoichiometric air-fuel ratio A/Fs, and is equal to or less than a lean determination value VL when the post-catalyst air-fuel ratio A/Frr is an air-fuel ratio on the lean side larger than the stoichiometric air-fuel ratio A/Fs.

As shown in FIGS. 2(A) and 2(B), when the output voltage of the post-catalyst sensor 42 is changed from the rich side to the lean side to be equal to the lean determination value VL (a time point t1), the target air-fuel ratio A/Ft is switched from the lean air-fuel ratio A/Fl to the rich air-fuel ratio A/Fr.

Subsequently, when the output voltage of the post-catalyst sensor 42 is changed from the lean side to the rich side to be equal to the rich determination value VR (a time point t2), the target air-fuel ratio A/Ft is switched from the rich air-fuel ratio A/Fr to the lean air-fuel ratio A/Fl.

While the active air-fuel ratio control for performing such air-fuel ratio change is being executed, the oxygen storage capacity OSC of the catalyst 32 is measured, to thereby determine the deterioration of the catalyst 32. In the following, the active air-fuel ratio control will be further described.

Figure 2:
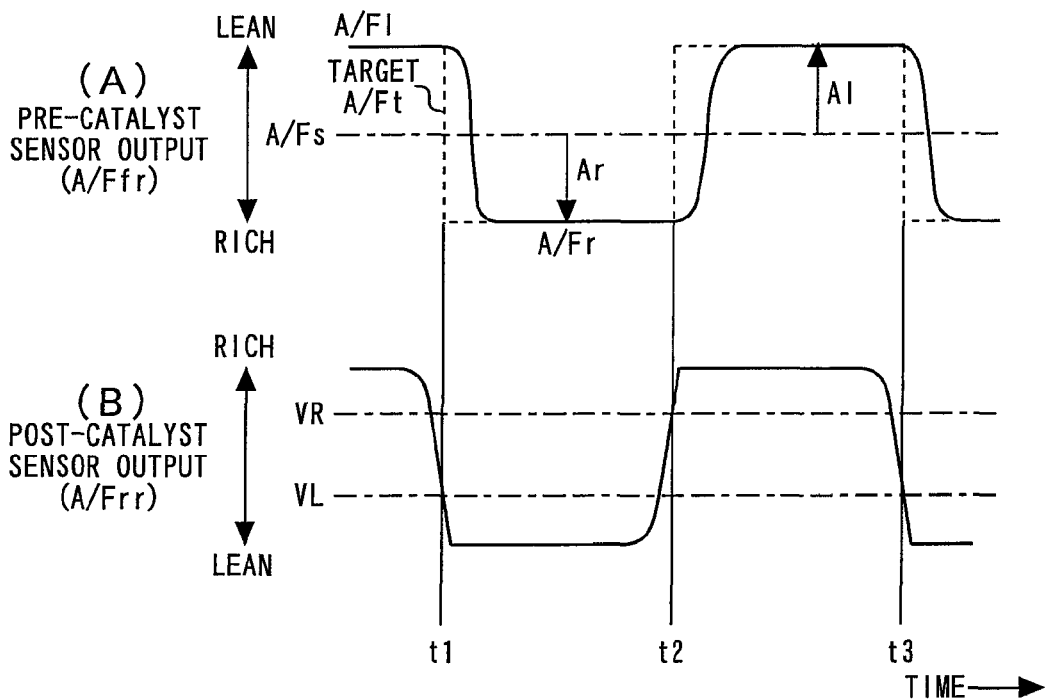
FIG. 2 shows outputs of a pre-catalyst sensor and a post-catalyst sensor in an active air-fuel ratio control.

In FIG. 2, the target air-fuel ratio A/Ft is the lean air-fuel ratio A/Fl before the time point t1, and a lean gas flows into the catalyst 32. During this time, the catalyst 32 keeps absorbing oxygen. When fully absorbing oxygen, the catalyst 32 cannot absorb oxygen anymore, so that the lean gas passes through the catalyst 32 to flow out to the downstream side of the catalyst 32. The post-catalyst air-fuel ratio A/Frr is thereby changed to the lean side, and the output voltage of the post-catalyst sensor 42 reaches the lean determination value VL (t1). At this point, the target air-fuel ratio A/Ft is switched to the rich air-fuel ratio A/Fr. The target air-fuel ratio A/Ft is reversed based on the output of the post-catalyst sensor 42 as described above.

Subsequently, a rich gas flows into the catalyst 32. During this time, the catalyst 32 keeps releasing the oxygen stored until then. The exhaust gas having the substantially stoichiometric air-fuel ratio A/Fs thereby flows out to the downstream side of the catalyst 32. Thus, the post-catalyst air-fuel ratio A/Frr does not become rich, and the output of the post-catalyst sensor 42 is not reversed. The catalyst 32 keeps releasing the oxygen, to finally release all the oxygen stored in the catalyst 32. Since the catalyst 32 does not release oxygen anymore, the rich gas passes through the catalyst 32 to flow out to the downstream side of the catalyst 32. The post-catalyst air-fuel ratio A/Frr is thereby changed to the rich side, and the output voltage of the post-catalyst sensor 42 reaches the rich determination value VR (t2). At this point, the target air-fuel ratio A/Ft is switched to the lean air-fuel ratio A/Fl.

In the active air-fuel ratio control as described above, as the oxygen storage capacity OSC is larger, the catalyst 32 can absorb or release oxygen for a longer time. That is, in a case where the catalyst 32 has not deteriorated, the reverse cycle of the target air-fuel ratio A/Ft (a time from t1 to t2, for example) is extended. Meanwhile, as the deterioration of the catalyst 32 advances, the reverse cycle of the target air-fuel ratio A/Ft is shortened.

Figure 3:
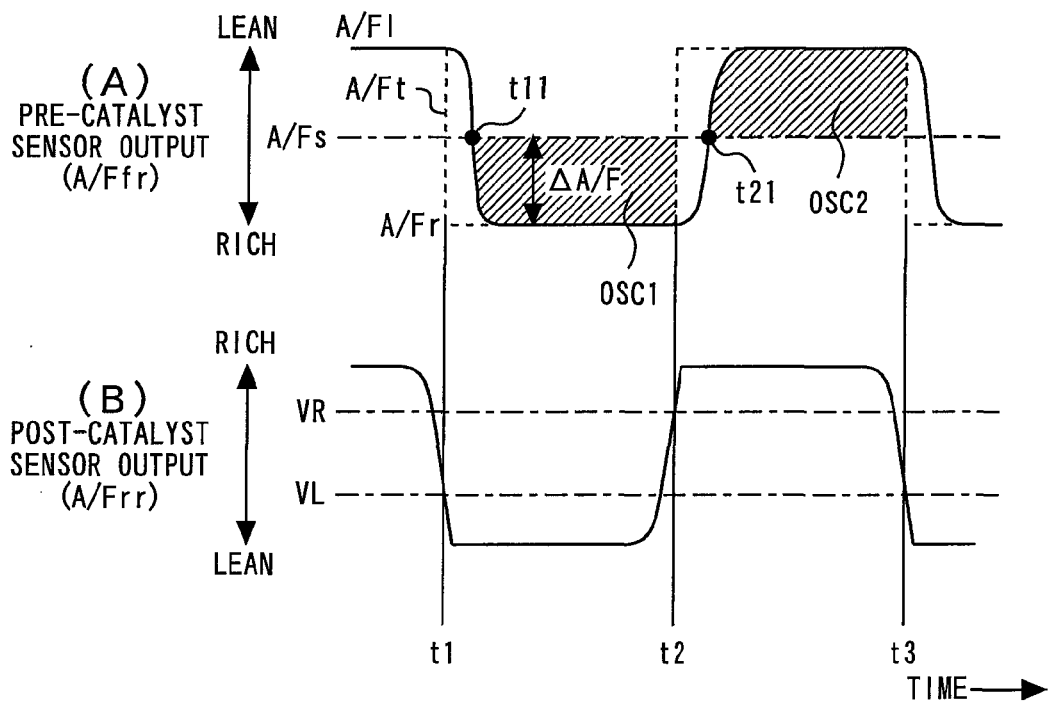
FIG. 3 shows outputs of a pre-catalyst sensor and a post-catalyst sensor in an active air-fuel ratio control.

FIG. 3 are views similar to FIG. 2. In the following, a specific method for calculating the oxygen storage capacity OSC will be described by reference to FIG. 3. The oxygen storage capacity OSC can be considered equal to the oxygen amount released from a time point t11 when the exhaust gas having a rich air-fuel ratio starts flowing into the catalyst 32 that has fully stored oxygen to the time point t2 when the post-catalyst air-fuel ratio A/Frr is changed to the rich side. Thus, a released oxygen amount dC per a minute length of time calculated by the following expression (1) is integrated from the time point t11 to the time point t2, so that an oxygen storage capacity OSC1 can be obtained.

$$dC = \Delta A/F \times Q \times K = |A/Ffr - A/Fs| \times Q \times K \quad (1)$$

Here, Q is the fuel injection amount, and K is the ratio of oxygen (about 0.23) contained in air.

In the present invention, although the deterioration of the catalyst 32 may be determined using the oxygen storage capacity OSC1 obtained from one time of calculation, an oxygen storage capacity OSC2 may be calculated similarly on the lean side, or a plurality of times of calculations may be further performed on the rich side and the lean side as needed, to improve accuracy. In this case, the deterioration is finally determined by comparing the average value thereof with a predetermined deterioration determination value.

As shown in FIG. 3, the oxygen storage capacity OSC2 calculated on the lean side can be considered equal to the oxygen amount absorbed from a time point t21 when the exhaust gas having a lean air-fuel ratio starts flowing into the catalyst 32 that has fully released oxygen to a time point t3 when the post-catalyst air-fuel ratio A/Ffr is changed to the lean side. Thus, the released oxygen amount dC per a minute length of time calculated by the above expression (1) is integrated from the time point t21 to the time point t3, so that the oxygen storage capacity OSC2 can be obtained.

When the oxygen storage capacity OSC is measured using the above method, it is important to detect a timing at which the pre-catalyst air-fuel ratio A/Ffr is changed from lean to rich (the time point t11), or from rich to lean (the time point t21) with high accuracy. If the timings are not accurately detected, an error occurs in the time obtained by integration of dC, and the oxygen storage capacity OSC cannot be accurately calculated.

However, generally, in the engine having the turbocharger with the wastegate valve, it is difficult to detect the timing at which the pre-catalyst air-fuel ratio A/Ffr is changed with high accuracy when the wastegate valve is opened. The reason will be described by reference to FIG. 4.

Figure 4:
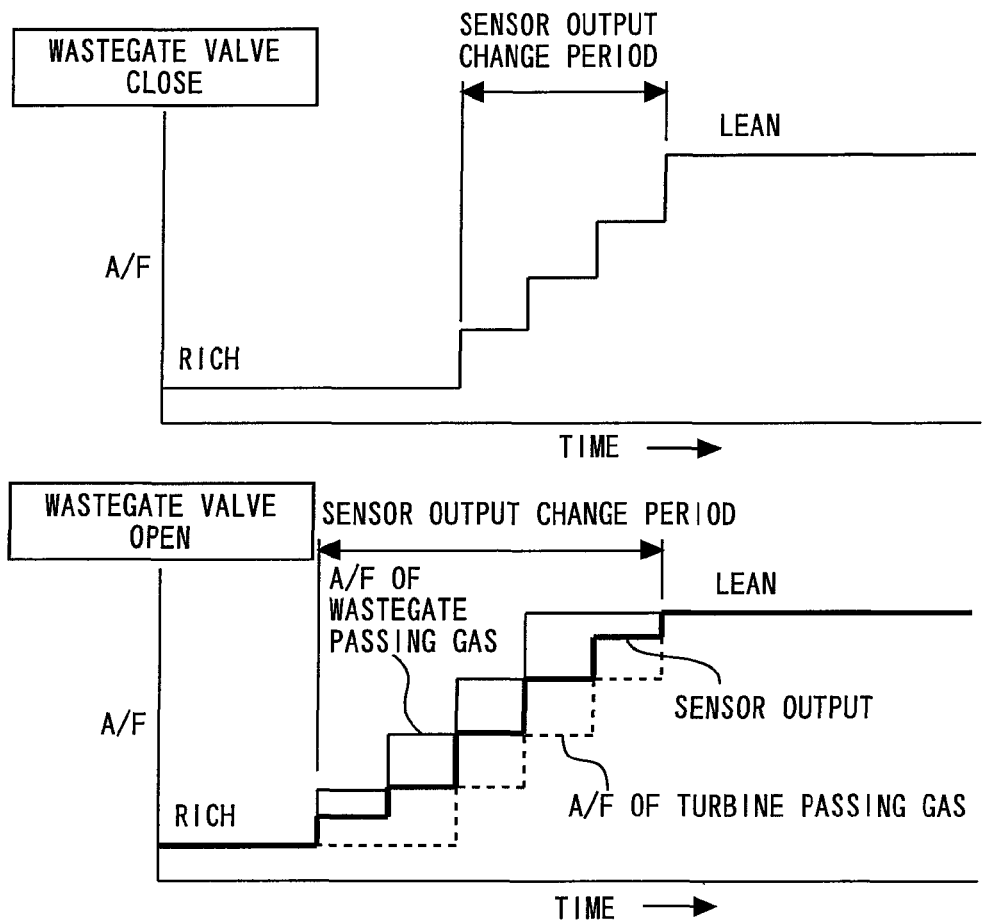
FIG. 4 is a view schematically illustrating a change in the output of the pre-catalyst sensor after a target air-fuel ratio of an internal combustion engine is switched.

FIG. 4 is a view schematically illustrating a change in the output of the pre-catalyst sensor 40 after the target air-fuel ratio of the internal combustion engine 10 is switched in both a case where the wastegate valve 38 is closed and a case where the wastegate valve 38 is opened. Although the following description is based on a case in which the target air-fuel ratio of the internal combustion engine 10 is switched from rich to lean, the same applies to a case in which the target air-fuel ratio of the internal combustion engine 10 is switched from lean to rich.

Although the actual air-fuel ratio A/F continuously changes, it is shown that the air-fuel ratio A/F changes in a stepwise manner in FIG. 4 for the easiness of understanding by schematic illustration.

A graph on the upper stage of FIG. 4 shows the change in the output of the pre-catalyst sensor 40 when the target air-fuel ratio is changed from rich to lean with the wastegate valve 38 being closed. The response speed of the pre-catalyst sensor 40 is limited. Thus, even when the air-fuel ratio of the exhaust gas in contact with the pre-catalyst sensor 40 is changed from rich to lean, it takes a certain time before the output of the pre-catalyst sensor 40 is changed from rich to lean as shown in the graph. In the following description, a time required for the output of the pre-catalyst sensor 40 to be changed from rich to lean (or from lean to rich) is referred to as "sensor output change period". The output change of the pre-catalyst sensor 40 is shown to be inclined more gently in FIG. 4 than those in FIGS. 2 and 3 since the time axis (the horizontal axis) is enlarged.

Meanwhile, a thick solid line in a graph on the lower stage of FIG. 4 indicates the change in the output of the pre-catalyst sensor 40 when the target air-fuel ratio is changed from rich to lean with the wastegate valve 38 being opened. As shown in the graph, when the wastegate valve 38 is opened, the sensor output change period is extended as compared to the case in which the wastegate valve 38 is closed. The reason is as follows.

When the wastegate valve 38 is opened, the exhaust gas discharged from each of the cylinders of the internal combustion engine 10 is divided into a portion passing through the turbine 241 to reach the pre-catalyst sensor 40, and a portion passing through the wastegate valve 38 (the wastegate 34 or 36) to reach the pre-catalyst sensor 40. A dashed line in the graph on the lower stage of FIG. 4 indicates the change in the output of the pre-catalyst sensor 40 when it is supposed that only the former exhaust gas, that is, the exhaust gas passing through the turbine 241 (referred to as "turbine passing gas" below) is brought into contact with the pre-catalyst sensor 40. The change in the output of the pre-catalyst sensor 40 in this case is the same as that of the case where the wastegate valve 38 is closed (the graph on the upper stage of FIG. 4).

Meanwhile, a thin solid line in the graph on the lower stage of FIG. 4 indicates the change in the output of the pre-catalyst sensor 40 when it is supposed that only the exhaust gas passing through the wastegate valve 38 (referred to as "wastegate passing gas" below) is brought into contact with the pre-catalyst sensor 40. Since it takes time for the turbine passing gas to pass through the turbine 241, the turbine passing gas reaches the pre-catalyst sensor 40 slower than the wastegate passing gas. Conversely, the wastegate passing gas reaches the pre-catalyst sensor 40 faster than the turbine passing gas. Thus, in the graph of FIG. 4, the wave of the thin solid line is shifted frontward from the wave of the dashed line.

When the wastegate valve 38 is opened, a mixed gas of the turbine passing gas and the wastegate passing gas is actually brought into contact with the pre-catalyst sensor 40. Thus, the actual output of the pre-catalyst sensor 40 is obtained between the output by the turbine passing gas (the dashed line) and the output by the wastegate passing gas (the thin solid line) as indicated by the thick solid line in the graph on the lower stage of FIG. 4. As a result, the sensor output change period is extended as compared to the case in which the wastegate valve 38 is closed. In the example shown in FIG. 4, the ratio of the turbine passing gas and the wastegate passing gas is 50:50, and the both gases are mixed uniformly to be brought into contact with the pre-catalyst sensor 40.

As described above, when the wastegate valve 38 is opened, the sensor output change period is extended and the output change amount of the pre-catalyst sensor 40 per unit time is reduced as compared to the case in which the wastegate valve 38 is closed. That is, the response of the pre-catalyst sensor 40 seems to be reduced. Thus, when the oxygen storage capacity OSC is measured, it is difficult to detect the timing at which the pre-catalyst air-fuel ratio A/Ffr is changed from lean to rich, or from rich to lean with high accuracy.

Moreover, in the example shown in FIG. 4, it is supposed that the ratio of the turbine passing gas and the wastegate passing gas is 50:50, and the both gases are mixed uniformly to be brought into contact with the pre-catalyst sensor 40. However, actually, the ratio of the turbine passing gas and the wastegate passing gas varies widely, and the turbine passing gas and the wastegate passing gas are not mixed uniformly before reaching the pre-catalyst sensor 40. Thus, the waveform of the output of the pre-catalyst sensor 40 obtained when the wastegate valve 38 is opened varies irregularly from time to time. As a result, when the wastegate valve 38 is opened, it is more difficult to detect the timing at which the pre-catalyst air-fuel ratio A/Ffr is changed from lean to rich, or from rich to lean with high accuracy.

As described above, when the wastegate valve 38 is opened, it is difficult to detect the timing at which the pre-catalyst air-fuel ratio A/Ffr is changed with high accuracy by the pre-catalyst sensor 40, to measure the oxygen storage capacity OSC. Thus, the oxygen storage capacity OSC cannot be accurately measured.

Meanwhile, when the wastegate valve 38 is closed, the problems as described above do not occur, so that the oxygen storage capacity OSC can be accurately measured. Accordingly, in the present embodiment, an instruction to close the wastegate valve 38 is issued to perform the measurement of the oxygen storage capacity OSC (the deterioration detection of the catalyst 32) when the oxygen storage capacity OSC needs to be measured (the deterioration of the catalyst 32 needs to be detected).

[Specific Process in Embodiment 1]

Figure 5:
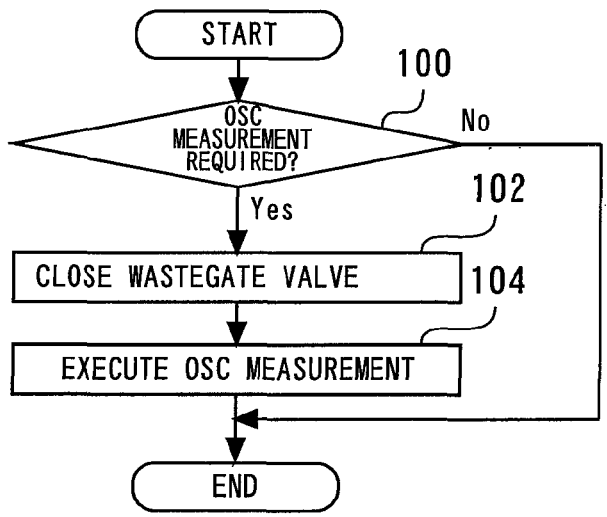
FIG. 5 is a flowchart illustrating a routine that is executed by the first embodiment of the present invention.

FIG. 5 is a flowchart of a routine executed by the ECU 50 in the present embodiment for achieving the aforementioned function. According to the routine shown in FIG. 5, it is first determined whether or not the control for measuring the oxygen storage capacity OSC is required (step 100). The deterioration detection of the catalyst 32 is normally executed once per trip of the internal combustion engine 10. In step 100, in a case where the deterioration detection of the catalyst 32 has not been finished in this trip and a predetermined condition that the internal combustion engine 10 has been warmed up or the like is satisfied, it is determined that the control for measuring the oxygen storage capacity OSC is required. Meanwhile, if this is not the case, it is determined that the control for measuring the oxygen storage capacity OSC is not required.

When it is determined that the control for measuring the oxygen storage capacity OSC is required in step 100, an instruction to close the wastegate valve 38 is issued to the actuator of the wastegate valve 38 (step 102). After the wastegate valve 38 is closed based on the instruction, the control for measuring the oxygen storage capacity OSC is executed (step 104). That is, the active air-fuel ratio control is executed as described by reference to FIGS. 2 and 3 to measure the oxygen storage capacity OSC in step 104.

According to the aforementioned first embodiment, the oxygen storage capacity OSC can be always measured with the wastegate valve 38 being closed when it is necessary to measure the oxygen storage capacity OSC. Accordingly, the oxygen storage capacity OSC can be accurately measured. The deterioration of the catalyst 32 can be thereby determined with high accuracy.

Although it is most preferable that the wastegate valve 38 is fully closed when the oxygen storage capacity OSC is measured, the wastegate valve 38 may be opened with an opening degree small enough not to cause a problem in detecting the timing at which the pre-catalyst air-fuel ratio A/Ffr is changed with high accuracy in the present invention. To be more specific, in the present invention, a threshold value for the opening degree of the wastegate valve by which no problem is caused in detecting the timing at which the pre-catalyst air-fuel ratio A/Ffr is changed with high accuracy may be set in advance, and the opening degree of the wastegate valve may be controlled to be less than the predetermined threshold value in step 102. In this case, the same effects as those described above can be also obtained.

Although the example in which the present invention is applied to the control for measuring the oxygen storage capacity OSC is described in the present embodiment, the present invention may be also applied to various control (air-fuel ratio change detection control) performed for the purpose of detecting the change in the air-fuel ratio A/F by the pre-catalyst sensor 40 (or the post-catalyst sensor 42) by changing (abruptly changing) the air-fuel ratio A/F on the upstream side of the turbine 241 and the wastegate valve 38 in a stepwise manner.

Examples of the air-fuel ratio change detection control other than the control for measuring the oxygen storage capacity OSC include control for diagnosing a decrease in response due to the deterioration of the pre-catalyst sensor 40. As the pre-catalyst sensor 40 deteriorates, the response (an output level or a response speed) gradually decreases. Thus, the change in the air-fuel ratio may be detected by the pre-catalyst sensor 40 by changing (abruptly changing) the air-fuel ratio (for example, the combustion air-fuel ratio of the internal combustion engine 10) on the upstream side of the turbine 241 and the wastegate valve 38 in a stepwise manner, and the deterioration of the pre-catalyst sensor 40 may be determined based on whether or not the output level or response speed at this time satisfies a predetermined reference value. The change given to the air-fuel ratio on the upstream side of the turbine 241 and the wastegate valve 38 here may not always be a change between an air-fuel ratio richer than the stoichiometric air-fuel ratio and an air-fuel ratio leaner than the stoichiometric air-fuel ratio. That is, the air-fuel ratio may be changed in a stepwise manner within a range richer than the stoichiometric air-fuel ratio (or within a range leaner than the stoichiometric air-fuel ratio).

The aforementioned respective modifications may be similarly applied to embodiments described below.

In the aforementioned first embodiment, the pre-catalyst sensor 40 corresponds to "exhaust gas sensor" according to the first invention. Also, "air-fuel ratio change detection controlling means" according to the first to third inventions is achieved by the ECU 50 executing the processes in steps 102 and 104.

Embodiment 2

Figure 6:
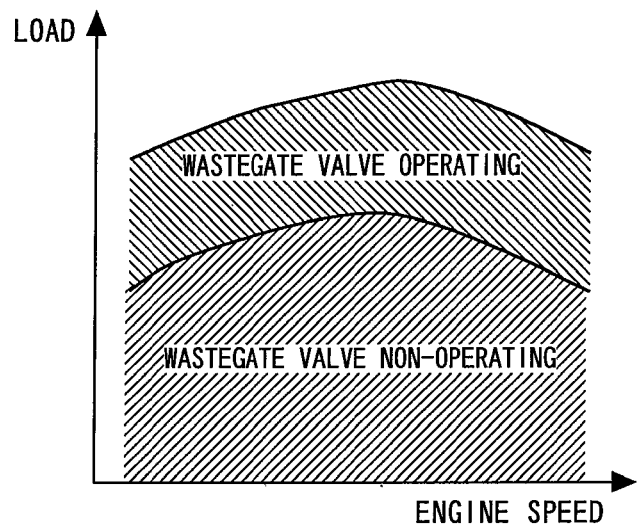
FIG. 6 is a map illustrating an operating region and a non-operating region of a wastegate valve.

Next, a second embodiment according to the present invention will be described by reference to FIGS. 6 and 7. Note that different points from those of the first embodiment will be mainly described, and the description of similar points will be simplified or omitted.

In the aforementioned first embodiment, the system in which the ECU 50 actively controls the opening/closing of the wastegate valve 38 is described. Meanwhile, in the present embodiment, a system in which the wastegate valve 38 is passively opened/closed according to the operating condition of the internal combustion engine 10 is employed. The wastegate valve 38 according to the present embodiment is configured to be opened/closed according to a balance between a force applied by a supercharging pressure to a diaphragm and a spring force, for example. To be more specific, when the supercharging pressure is smaller than a prescribed value, the wastegate valve 38 is closed by the spring force. Meanwhile, when the supercharging pressure reaches the prescribed value or more, the force applied to the diaphragm overcomes the spring force, so that the wastegate valve 38 is opened.

Since hardware configuration in the present embodiment is the same as that of the aforementioned first embodiment except for the above point, it is not shown in the drawings.

The supercharging pressure by the turbocharger 24 varies according to the load and engine rotation speed of the internal combustion engine 10. Thus, whether the wastegate valve 38 is closed or opened can be determined from the load and engine rotation speed of the internal combustion engine 10. FIG. 6 is a map illustrating an operating region and a non-operating region of the wastegate valve 38. When the load and engine rotation speed of the internal combustion engine 10 are within the operating region shown in FIG. 6, the supercharging pressure is equal to or more than the prescribed value. It is thereby determined that the wastegate valve 38 is opened. When the load and engine rotation speed of the internal combustion engine 10 are within the non-operating region shown in FIG. 6, the supercharging pressure is less than the prescribed value. It is thereby determined that the wastegate valve 38 is closed. Accordingly, in the present embodiment, the execution of the control for measuring the oxygen storage capacity OSC is allowed only when the load and engine rotation speed of the internal combustion engine 10 are within the non-operating region.

[Specific Process in Embodiment 2]

Figure 7:
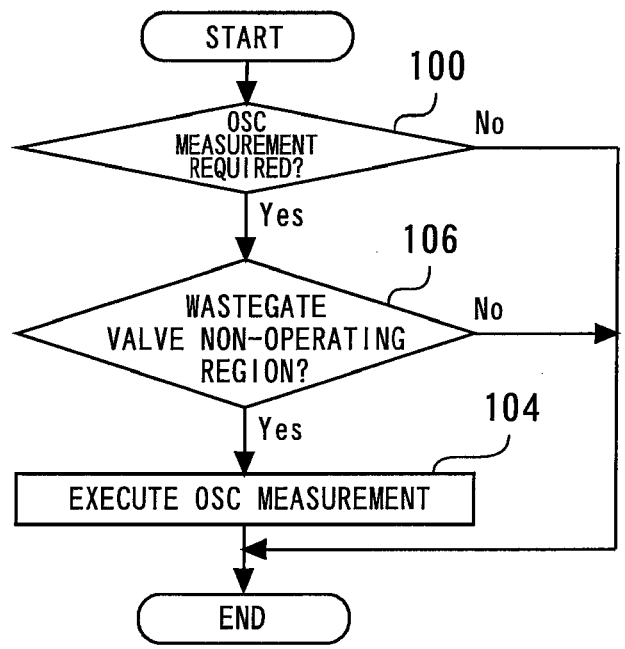
FIG. 7 is a flowchart illustrating a routine that is executed by a second embodiment of the present invention.

FIG. 7 is a flowchart of a routine executed by the ECU 50 in the present embodiment for achieving the above function. In FIG. 7, the same steps as those in FIG. 5 are assigned the same reference numerals to omit or simplify the description.

According to the routine shown in FIG. 7, it is first determined whether or not the control for measuring the oxygen storage capacity OSC is required (step 100). When it is determined that the control is required, it is then determined whether or not the current operating condition of the internal combustion engine 10 is within the wastegate valve non-operating region (step 106). The determination is performed based on the load and engine rotation speed of the internal combustion engine 10 and the map shown in FIG. 6.

When it is determined that the operating condition is not within the wastegate valve non-operating region, that is, within the wastegate valve operating region in step 106, it is determined that the wastegate valve 38 is currently opened. In this case, it is determined that the oxygen storage capacity OSC cannot be accurately measured. Thus, in this case, the routine is terminated without executing the measurement of the oxygen storage capacity OSC.

Meanwhile, when it is determined that the operating condition is within the wastegate valve non-operating region in step 106, it is determined that the wastegate valve 38 is currently closed. In this case, the oxygen storage capacity OSC can be accurately measured. Thus, in this case, the control for measuring the oxygen storage capacity OSC is executed (step 104). That is, the above active air-fuel ratio control is executed to measure the oxygen storage capacity OSC.

According to the aforementioned second embodiment, in the case of the operating condition where the wastegate valve 38 is determined to be opened, the measurement of the oxygen storage capacity OSC is prohibited. The measurement of the oxygen storage capacity OSC can be allowed only in the case of the operating condition where the wastegate valve 38 is determined to be closed. Thus, the measurement of the oxygen storage capacity OSC is always executed when the wastegate valve 38 is closed. Accordingly, the oxygen storage capacity OSC can be accurately measured, and the deterioration of the catalyst 32 can be determined with high accuracy.

In the aforementioned second embodiment, "opening-closing state determining means" and "prohibiting means" according to the fourth invention are achieved by the ECU 50 executing the processes in the routine shown in FIG. 7.

Embodiment 3

Next, a third embodiment according to the present invention will be described by reference to FIGS. 8 and 9. Note that different points from those of the aforementioned embodiments will be mainly described, and the description of similar points will be simplified or omitted. Hardware configuration in the present embodiment is the same as that of the aforementioned first embodiment as shown in FIG. 1. That is, the internal combustion engine 10 according to the present embodiment is an in-line four-cylinder type having four cylinders #1 to #4, the explosion order is #1→#3→#4→#2, and the explosion interval is 180° CA (crank angle).

The exhaust manifold of the internal combustion engine 10 according to the present embodiment is divided into the first exhaust manifold 26 and the second exhaust manifold 28 as described above. The first exhaust manifold 26 allows the exhaust gases from the cylinders #1 and #4 to merge with each other, and the second exhaust manifold 28 allows the exhaust gases from the cylinders #2 and #3 to merge with each other.

As shown in FIG. 1, the pipe length of the first exhaust manifold 26 is longer than the pipe length of the second exhaust manifold 28. The volume of the first exhaust manifold 26 is thus larger than the volume of the second exhaust manifold 28. A time required for the exhaust gases from the cylinders #1 and #4 to pass through the first exhaust manifold 26 to flow into the turbine 241 is thus longer than a time required for the exhaust gases from the cylinders #2 and #3 to pass through the second exhaust manifold 28 to flow into the turbine 241. Accordingly, a time required for the exhaust gases from the cylinders #1 and #4 to reach the pre-catalyst sensor 40 is longer than a time required for the exhaust gases from the cylinders #2 and #3 to reach the pre-catalyst sensor 40. In the present embodiment, the time difference is 360° CA.

In the following description, the volume of the exhaust passage on the upstream side of the turbine 241 with respect to each of the cylinders is referred to as "turbine upstream-side volume".

Figure 8:
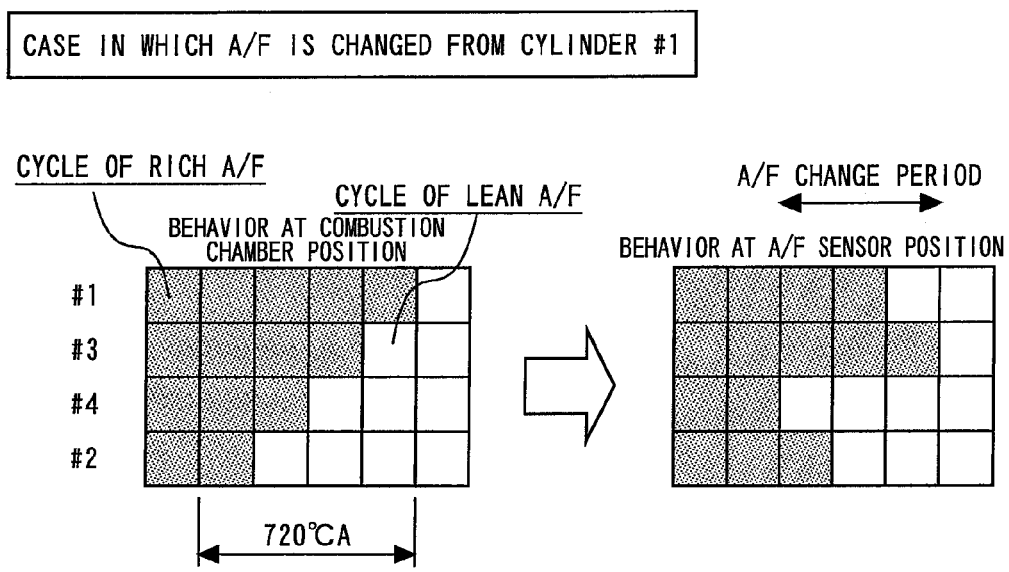
FIG. 8 is a view schematically illustrating the behavior of the exhaust gas when the air-fuel ratio of the internal combustion engine is switched from lean to rich.
Figure 9:
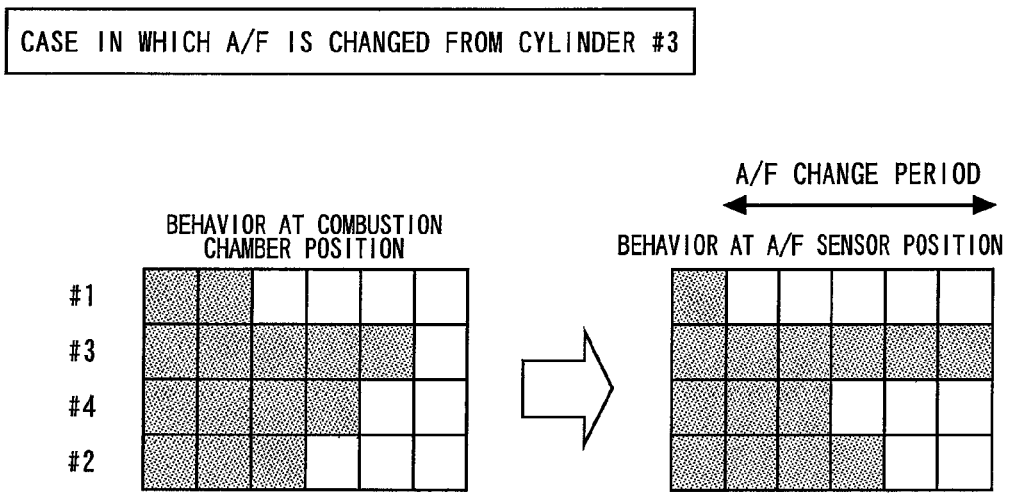
FIG. 9 is a view schematically illustrating the behavior of the exhaust gas when the air-fuel ratio of the internal combustion engine is switched from lean to rich.

FIGS. 8 and 9 are views respectively schematically illustrating the behaviors of the exhaust gases when the air-fuel ratio of the internal combustion engine 10 is switched from lean to rich. In the drawings, white squares represent the exhaust gas having a lean air-fuel ratio, and hatched squares represent the exhaust gas having a rich air-fuel ratio. In both the drawings, the view on the left side shows the behaviors of the exhaust gases in a combustion chamber, and the view on the right side shows the behaviors of the exhaust gases at the position of the pre-catalyst sensor 40. Actually, the exhaust gases from the respective cylinders are mixed together, that is, the exhaust gases represented by the squares in a vertical line in the drawings are mixed together at the position of the pre-catalyst sensor 40.

As described above, the time required for the exhaust gases from the cylinders #1 and #4 to reach the pre-catalyst sensor 40 is longer than the time required for the exhaust gases from the cylinders #2 and #3 to reach the pre-catalyst sensor 40 by 360° CA. Accordingly, as for the behaviors of the exhaust gases at the position of the pre-catalyst sensor 40, the exhaust gases from the cylinders #1 and #4 are delayed by two squares in the drawings from the exhaust gases from the cylinders #2 and #3 in relation to the behaviors in the combustion chamber.

FIG. 8 shows a case in which the air-fuel ratio of the cylinder #1 is switched first, that is, a case in which the fuel injection amount is changed first in the fuel injector 16 of the cylinder #1. In this case, the exhaust gases in the combustion chambers of the respective cylinders are switched from lean to rich first in the cylinder #1, and then, switched in the order of the cylinder #3, the cylinder #4, and the cylinder #2 at an interval of 180° CA as shown in the view on the left side of FIG. 8. In this case, a period required for the air-fuel ratio of the exhaust gas to be switched from lean to rich at the position of the pre-catalyst sensor 40 (referred to as "A/F change period" below) is 540° CA as shown in the view on the right side of FIG. 8.

Meanwhile, FIG. 9 shows a case in which the air-fuel ratio of the cylinder #3 is switched first, that is, a case in which the fuel injection amount is changed first in the fuel injector 16 of the cylinder #3. In this case, the exhaust gases in the combustion chambers of the respective cylinders are switched from lean to rich first in the cylinder #3, and then, switched in the order of the cylinder #4, the cylinder #2, and the cylinder #1 at an interval of 180° CA as shown in the view on the left side of FIG. 9. In this case, the A/F change period at the position of the pre-catalyst sensor 40 is 900° CA as shown in the view on the right side of FIG. 9.

As described above, when the air-fuel ratio is switched first in the cylinder #1 (or the cylinder #4) having a large turbine upstream-side volume at the time of switching the air-fuel ratio of the internal combustion engine 10, the A/F change period at the position of the pre-catalyst sensor 40 can be shortened as compared to the case in which the air-fuel ratio is switched first in the cylinder #3 (or the cylinder #2) having a small turbine upstream-side volume. When the A/F change period at the position of the pre-catalyst sensor 40 can be shortened, the timing at which the pre-catalyst air-fuel ratio A/Ffr is changed from lean to rich, or from rich to lean can be detected by the pre-catalyst sensor 40 with higher accuracy.

Accordingly, in the present embodiment, the air-fuel ratio is switched first in the cylinder #1 (or the cylinder #4) when the air-fuel ratio of the internal combustion engine 10 is alternately switched between rich and lean in the active air-fuel ratio control for measuring the oxygen storage capacity OSC. The oxygen storage capacity OSC can be more accurately measured since the timing at which the pre-catalyst air-fuel ratio A/Ffr is changed from lean to rich, or from rich to lean can be detected with higher accuracy.

In the internal combustion engine 10 according to the present embodiment, the turbine upstream-side volume of the cylinder #1 is equal to the turbine upstream-side volume of the cylinder #4, and the turbine upstream-side volume of the cylinder #2 is equal to the turbine upstream-side volume of the cylinder #3. In the case of employing an internal combustion engine where each cylinder has different turbine upstream-side volume, the air-fuel ratio of a cylinder having a largest turbine upstream-side volume may be switched first.

Since the present embodiment is the same as the aforementioned first embodiment except for the above point, the further description is omitted.

The invention claimed is:

1. A control apparatus for an internal combustion engine comprising:
    a turbocharger having a turbine operating with exhaust energy of an internal combustion engine, and a compressor for compressing an intake gas;
    a wastegate through which an exhaust gas passes while bypassing the turbine;
    a wastegate valve for opening/closing the wastegate;
    an exhaust gas sensor provided in an exhaust passage on a downstream side from the turbine and the wastegate valve; and
    an air-fuel ratio change detection control that is programmed to execute air-fuel ratio change detection control to change an air-fuel ratio on an upstream side from the turbine and the wastegate valve and detect a timing of change in the air-fuel ratio by the exhaust gas sensor,
    wherein the air-fuel ratio change detection control is programmed to execute the air-fuel ratio change detection control when an opening degree of the wastegate valve varies within a range that is less than a predetermined value that can prevent the air-fuel ratio change detection control from being adversely affected.

2. The control apparatus for an internal combustion engine according to claim 1, wherein the air-fuel ratio change detection control is programmed to execute the air-fuel ratio change detection control when the wastegate valve is fully closed.

3. The control apparatus for an internal combustion engine according to claim 1, wherein the air-fuel ratio change detection control is programmed to control the wastegate valve such that the opening degree of the wastegate valve is less than the predetermined value before executing the air-fuel ratio change detection control.

4. The control apparatus for an internal combustion engine according to claim 1, further comprising:
    an opening-closing state determining unit programmed to determine an opening-closing state of the wastegate valve; and
    a prohibiting unit programmed to prohibit the execution of the air-fuel ratio change detection control when the opening-closing state determining unit determines that the opening degree of the wastegate valve is equal to or more than the predetermined value.

5. The control apparatus for an internal combustion engine according to claim 1, wherein the air-fuel ratio change detection control is programmed to diagnose the exhaust gas sensor or an exhaust purification catalyst.

6. The control apparatus for an internal combustion engine according to claim 1, wherein the internal combustion engine comprises a plurality of cylinders, and
    the air-fuel ratio change detection control is programmed to first change an air-fuel ratio of a cylinder where an exhaust passage on the upstream side from the turbine has a largest volume when changing an air-fuel ratio of each of the cylinders.

7. A control apparatus for an internal combustion engine comprising:
    a turbocharger having a turbine operating with exhaust energy of an internal combustion engine, and a compressor for compressing an intake gas;
    a wastegate through which an exhaust gas passes while bypassing the turbine;
    a wastegate valve for opening/closing the wastegate;
    an exhaust gas sensor provided in an exhaust passage on a downstream side from the turbine and the wastegate valve; and
    an air-fuel ratio change detection controlling device for executing air-fuel ratio change detection control to change an air-fuel ratio on an upstream side from the turbine and the wastegate valve and detect a timing of change in the air-fuel ratio by the exhaust gas sensor,
    wherein the air-fuel ratio change detection controlling device executes the air-fuel ratio change detection control when an opening degree of the wastegate valve varies within a range that is less than a predetermined value that can prevent the air-fuel ratio change detection control from being adversely affected.

* * * * *

UNITED STATES PATENT AND TRADEMARK OFFICE
CERTIFICATE OF CORRECTION

PATENT NO. : 9,027,539 B2
APPLICATION NO. : 13/056070
DATED : May 12, 2015
INVENTOR(S) : S. Miyashita It is certified that error appears in the above-identified patent and that said Letters Patent is hereby corrected as shown below:

Specification

At column 4, line 65, change "#1→∩3→#4→2" to -- #1→#3→#4→#2 --.

At column 7, line 32, change "(a rich amplitude Ar, A>0)" to -- (a rich amplitude Ar, Ar>0) --.

At column 9, line 10, change "air-fuel ratio A/Ffr is changed" to -- air-fuel ratio A/Frr is changed --.

Signed and Sealed this
First Day of December, 2015

Michelle K. Lee
*Director of the United States Patent and Trademark Office*